United States Patent [19]

Davis

[11] 3,867,770
[45] Feb. 25, 1975

[54] SPEECH THERAPY DEVICE
[76] Inventor: Michael S. Davis, 730 Boris Ct., Rohnert Park, Calif. 94928
[22] Filed: Nov. 14, 1973
[21] Appl. No.: 415,571

[52] U.S. Cl.............. 35/35 R, 46/44, 128/DIG. 29, 272/57 F
[51] Int. Cl. .......................................... G09b 19/04
[58] Field of Search ............... 35/35 R, 35 A, 35 C; 46/44, 58, 1; 128/2.08, DIG. 29; 181/18, 19, 20, 21, 22; 272/57 F

[56] References Cited
UNITED STATES PATENTS
| | | | |
|---|---|---|---|
| 677,015 | 6/1901 | Cady | 128/2.08 |
| 764,546 | 7/1904 | Bardsley | 128/2.08 |
| 793,177 | 6/1905 | Cady | 128/2.08 |
| 3,167,871 | 2/1965 | Brooks | 35/35 C |
| 3,635,214 | 1/1972 | Rand et al. | 128/2.08 |

Primary Examiner—Wm. H. Grieb
Attorney, Agent, or Firm—Townsend and Townsend

[57] ABSTRACT

Apparatus for indicating and teaching proper tongue and mouth formation to correct various speech problems is disclosed. The apparatus includes means for capturing a substantial portion of the air from the mouth of an individual while speaking. The capture means isolates the air expelled from different parts of the mouth, and means are provided for visually indicating the magnitude of air expelled from each part of the mouth. The individual can achieve proper tongue and mouth formation through trial and error by watching the indicating means as he practices his speech.

17 Claims, 5 Drawing Figures

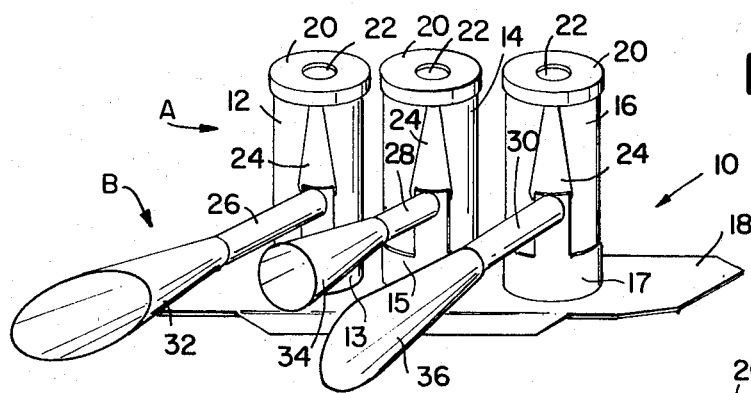
FIG_1
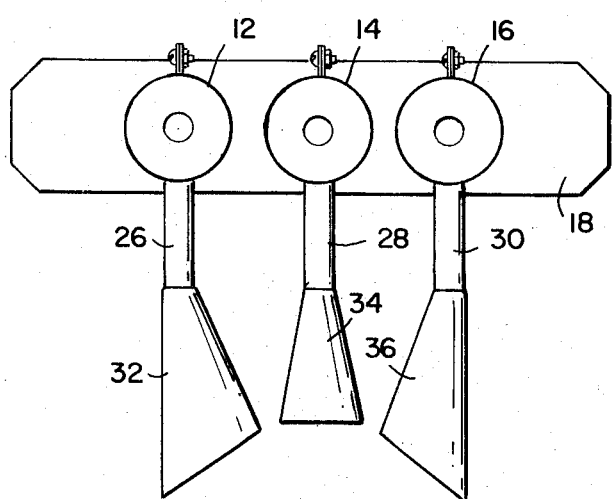
FIG_2
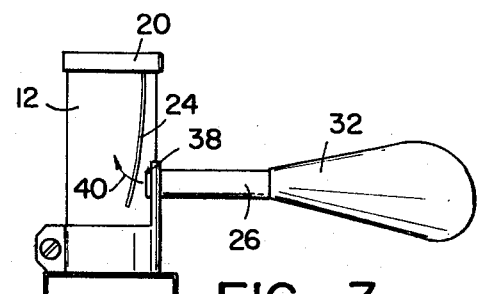
FIG_3
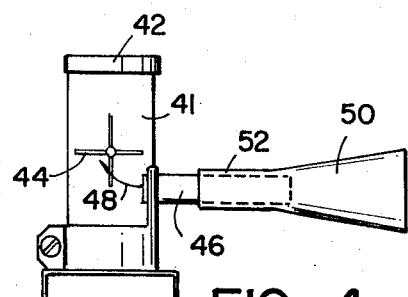
FIG_4
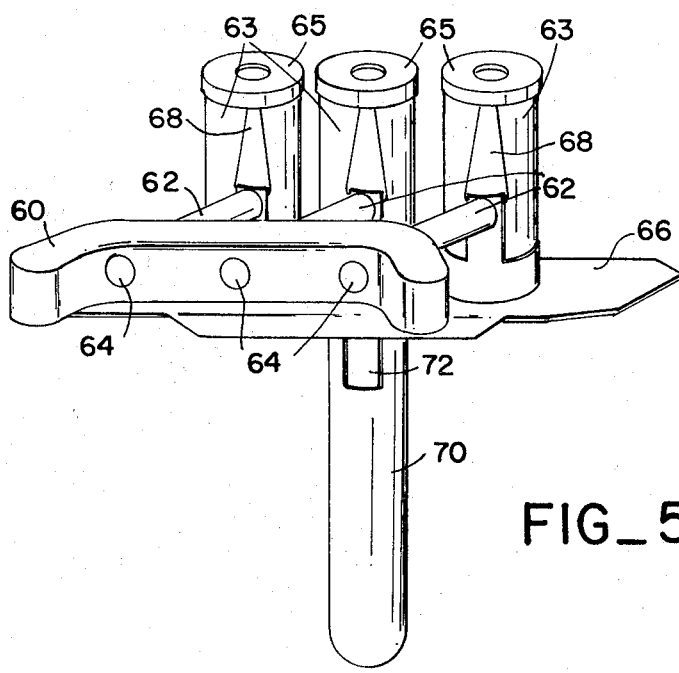
FIG_5

SPEECH THERAPY DEVICE

BACKGROUND OF THE INVENTION

The present invention relates to speech thereapy devices, and in particular to a means for indicating the relative air flow from different parts of the mouth to aid in the correction of speech defects such as lateral lisps.

Many speech problems result from a person's difficulty in a proper formation of his tongue and mouth. For example, a lateral lisp is caused by a failure to properly groove the tongue so that the air comes out of the front of the mouth and not the sides. Proper tongue formation requires fine muscular coordination, and is quite difficult to visualize. As a result, teaching the proper tongue formation without mechanical aids is a continuous process of verbally instructing a child to shape his tongue in the proper manner, then having the child practice speaking while listening for the proper sound.

The present invention provides apparatus for visually illustrating proper or improper tongue formation as an individual is speaking. Means are provided for capturing at least part of the air expelled from the mouth of the individual, and the air expelled from different parts of the mouth is isolated. Means are provided for visually indicating the magnitude of air expelled from each different part of the mouth. In this manner, a lateral lisp will be graphically illustrated by the indication of air expelled from the sides of the mouth, while proper tongue formation will be illustrated by the indication of air expelled from the center of the mouth. Other speech problems will be indicated by their peculiar airflow characteristics.

The apparatus of the present invention allows a child to actually see whether or not he is speaking properly. A child with a lateral lisp problem can practice making S sounds into the apparatus and rather than having the instructor listen to determine whether the child is making an S properly, the child himself can see the result. The child can thus practice on his own trying to direct air through the center of his mouth rather than the sides, and as he is practicing, his success or failure is apparent to him. In this manner, the child will rapidly learn proper tongue formation through his own trial and error, reducing the need for lengthy and difficult speed therapy.

It is apparent that the apparatus of the present invention is useful in correcting any speech problem which involves measuring relative flow of air from the mouth. For example, the present device could be used in teaching proper speech to persons who are hard of hearing and cannot hear their own speech to determine whether they are speaking properly. A variety of other such uses for the apparatus of the present invention will be apparent to persons trained in speech therapy.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a preferred embodiment of the present invention;

FIG. 2 is a top plan view of the embodiment of FIG. 1;

FIG. 3 is a side elevation view of the embodiment illustrated in FIG. 1;

FIG. 4 is a fragmentary side elevation view of an alternative embodiment of the center cylinder and tube of the present invention;

FIG. 5 is a perspective view of an alternative embodiment of the present invention.

DESCRIPTION OF THE PREFERRED EMBODIMENT

One preferred embodiment of the present invention is illustrated by way of reference of the perspective view of FIG. 1. The indicating means of the indicator 10 is shown generally at A and includes a set of 3 cylinders 12, 14 and 16 axially mounted on a flat plate 18. The sidewalls of each cylinder 12, 14 and 16 are transparent and are set into brackets 13, 15 and 17 which are rotatably attached to plate 18. Caps 20, which need not be transparent, cover the ends of the cylinder opposite plate 18 and each cap is provided with a small aperture 22 in the center. The actual indication mechanism of the indicating means A comprises small strips of material 24 which are suspended from the top of each cylinder 12, 14, 16 and hang within the cylinders. The strips are formed from light-weight resilient material, preferably celluloid, so that they will bend responsibly to movement of air as will be illustrated hereinafter.

The capture and isolating means of the present invention provided in indicator 10 is illustrated generally at B and includes a set of tubes 26, 28 and 30. These tubes are radially attached to the respective cylinders 12, 14 and 16 so that the tubes are laterally spaced in a generally horizontally plane. Each tube 26, 28 and 30 is attached to an extension of respective bracket 13, 15 and 17 at a radical aperture in the cylinders 12, 14 and 16, as will be later illustrated. Air is allowed to pass from the tubes into the respective associated cylinders, thereby connecting the capture and isolating means B of the present invention with the indicating means A.

In the indicator 10 illustrated in FIG. 1, the capture means B includes outwardly opening funnel portions 32, 34 and 36 at the respective open ends of tubes 26, 28 and 30. These funnels increase the capture of air expelled from the mouth of an individual while speaking. The conformation of the open ends of the tubes to the mouth of the user is illustrated by way of reference to FIG. 2. Open ends 32, 36 of the side tubes 26, 30 are inclined with respect to the longitudinal axes of the tubes to conform the ends of these tubes to the sides of the mouth. Since cylinders 12, 14 and 16 are rotatably attached to point 18 of indicator 10, tubes 26, 28 and 30 can be moved from side to side to fit the open ends 32, 34, 36 of the tubes to the mouths of different individuals.

The manner in which the celluloid strips 24 provide means for indicating the flow of air from respective parts of the mouth is illustrated by way of reference to FIG. 3. This figure illustrates only celluloid strip 24 in cylinder 12, but the operation of the celluloid strips in cylinders 14 and 16 is substantially the same. Strip 24 depends from the top of cylinder 12, and can be supported thereat by crimping a portion of the strip over the upper rim of the cylinder. Strip 24 is preferably tapered as illustrated in FIG. 1 to provide a narrow portion at the top and a wider portion at the bottom. The strip 24 is then attached to cylinder 12 by placing the cap 20 over the upper rim of the cylinder to fix the crimped portion to the cylinder.

Strip 24 depends to a position adjacent the attachment of tube 26 to cylinder 12. An aperture is provided in the sidewall of cylinder 12 at the junction of the cylinder and tube 26 so that end 38 of tube 26 passes slightly into the cylinder and air captured by the open end 32 of tube 26 passes through the tube and into the cylinder. Since aperture 22 is provided at the top of cylinder 12 in cap 20, this air is free to flow into and through the cylinder as illustrated by arrow 40. Celluloid strip 24 depends to a position adjacent the radial aperture and is tapered to cover the width of tube end 38 so that air passing through that aperture as illustrated by arrow 40 will deflect the strip. The relative volume of air will determine the extent of deflection of strip 24, thus visually indicating the relative volume of air passing therethrough. Since the sidewalls of the cylinders are transparent, the relative volume of air passing through each tube 26, 28 and 30 is easily visible to the user of the indicator 10 by watching the three strips 24.

An alternative embodiment to the celluloid strip 24 for indicating air flow in the center of the three cylinders is illustrated by way of reference to the fragmentary view of FIG. 4. The embodiment of FIG. 4 includes a center cylinder 41 and cap 42 similar to that illustrated in FIG. 1. However, in place of a celluloid strip depending from the top of the cylinder, a bladed paddle or windmill 44 is mounted transversely inside center cylinder 41. A similar windmill could be used in the side cylinders as well, but it is probably advantageous to have one device (windmill) to illustrate proper speech and a different device (strips) to illustrate improper speech, adding to the incentive to speak properly. Windmill 44 is located so that air entering cylinder 41 from tube 46, illustrated by arrow 48, causes the windmill to turn relative to the volume of air entering the cylinder.

In the embodiment of FIG. 4, the funnel portion 50 of center tube 46 is provided with a sleeve 52 which fits over tube 46. Sleeve 52 is in frictional contact with the outer surface of tube 46 so that the relative position of funnel portion 50 on tube 46 can be adjusted and will remain fixed until readjusted by the user. Adjustment of the length of the center tube allows the indicator to be more readily adjusted to the mouths of different users.

As an alternative to the rotatable tubes in the embodiment illustrated in FIG. 1, a crescent-shaped mouthpiece 60 could be provided as illustrated in FIG. 5. Mouthpiece 60 has three tubes 62 which attach to cylinders 65 axially mounted on plate 66 as in the foregoing embodiments (any number of tubes and cylinders could be used). Separate apertures 64 are provided at the junction of each tube 62 with mouthpiece 60 so that air captured by different portions of the mouthpiece are isolated and pass into various tubes 62. Hence, the object of the present invention that the air from different parts of the mouth be isolated and that separate indicating means 68 be provided for each respective section is achieved by the mouthpiece arrangement illustrated in FIG. 5. It is apparent that other such embodiments of the present invention could also be devised, but would still be within the socpe of the present invention.

The alternative embodiment of the present invention illustrated in FIG. 5 employs a handle 70 so that the apparatus of the present invention can conveniently be hand-held. The apparatus could be mounted on a shelf or other fixed surface, but in order to adapt the device for use by different individuals, it is useful to provide the handle 70 illustrated. Handle 70 could be adjusted if desired so that the apparatus is held in a slightly inclined position by means of pivotal adjustment 72 to increase the resistance of indicating means 68 to movement.

In operation, the apparatus of the present invention is used as follows. The indicator 10 is held by flat plate 18, or handle 70 if one is provided. The inclination of handle 70 in relation to plate 18 can be adjusted by means of pivotal adjustment 72 if desired. The indicator 10 is then held up to the mouth of the user, with the open end 34 of central tube 28 aligned with the center of the user's mouth. The relative positions of side tubes 26 and 30 are then adjusted to conform to the mouth of the user, open ends 32 and 36 being adjacent the sides of the mouth of the user. The length of center tube 28 is also adjusted if possible to further conform the open ends of the tubes to the mouth of the user.

In correcting a lateral lisp, the user makes an S sound as he holds the indicator 10 with the open ends 32, 34, 36 of the tubes next to his mouth. If the tip of the tongue of the user is grooved to properly form the S, only the strip 24 (or windmill 44) in center tube 14 will move, and the strips inside tubes 12 and 16 will remain stationary. However, if the tongue is not grooved properly, the strip 24 in the side tubes 12 and 16 will be flexed, indicating the improper tongue formation. If the user has a lisp problem, he can practice making the S sound into indicator 10, and determine his progress in achieving proper tongue formation by viewing the strips 24. Hence, through trial and error, the user can achieve the required muscular coordination and the lisp will be corrected.

The indicator 10 of the present invention is also useful in correcting speech problems other than lateral lisps. Specifically, one use which has been found for the indicator is the teaching of proper speech to persons who are hard of hearing. Since such a person cannot hear himself speak, he is not able to correct errors in his speech since he lacks the corrective feedback processes of other people. This is an essential problem with children who are hard of hearing from birth and it is difficult to teach these children to speak in a normal manner. However, with the indicator 10 of the present invention, the child who is hard of hearing can practice speaking into the indicator and attempt to simulate the motions of the flexible strips 24 which the instructor achieves. The child can thus be taught to speak in a normal manner.

While preferred embodiments of the present invention have been illustrated in detail, it is apparent that modifications and adaptations of these embodiments will occur to those skilled in the art. For example, the side tubes could be provided with whistle indicators in place of or as a supplement to the visual indicators. However, it is to be expressly understood that such modifications and adaptations are within the spirit and scope of the present invention, as set forth in the following claims.

What I claim is new is:

1. Apparatus for indicating and teaching proper tongue formation for speaking, said apparatus comprising:

means for at least partially capturing the air expelled from the mouth of an individual, said capture means including means for isolating the respective air expelled from different parts of the mouth; and means for visually indicating the magnitude of air expelled from each said different part of the mouth.

2. Apparatus as recited in claim 1 wherein the means for isolating the respective air expelled from different parts of the mouth comprises means for isolating the air expelled from the center and the two sides of the mouth respectively.

3. Apparatus as recited in claim 1 wherein the capture means comprises a set of laterally spaced tubes, each said tube open at one end and having air escape means at the other end, said tubes adapted to be positioned with the open ends of said tubes adjacent the mouth of the individual so that air expelled from different parts of the mouth enters the open ends of the tubes.

4. Apparatus as recited in claim 3 wherein the indicating means comprises a set of vertically mounted hollow cylinders having transparent sidewalls, each cylinder radially attached to the other end of one of the respective tubes and having a radial aperture providing air escape means from the tube to the associated cylinder, each such cylinder having an opening at the top so that air from the attached tube passes into the cylinder through the radial aperture, each said cylinder containing means for indicating the relative quantity of air passing into the cylinder through the radial aperture.

5. Apparatus for indicating and teaching proper tongue formation to individuals with lateral lisps or other speech problems, said apparatus comprising:

a set of laterally spaced tubes including a center tube and at least one side tube on each side of the center tube, each tube open at one end and having air escape means at the other end, said tubes placeable adjacent the mouth of an individual so that the open end of the center tube is adjacent the center of said mouth and the open end of each of the side tubes is adjacent the respective sides of the mouth so that at least a portion of the air expelled from the center of the mouth enters the open end of the center tube and passes therethrough, and at least a portion of the air expelled from the respective sides of the mouth enters the open end of the associated side tube and passes therethrough; and means for visually indicating the relative quantity of air passing through each respective tube so that an improper air expellation distribution is visually displayed and can be corrected by the individual through trial and error to teach a proper air expellation distribution.

6. Apparatus as recited in claim 5 and wherein each said tube has an outwardly opening funnel portion at the open end thereof.

7. Apparatus as recited in claim 6 wherein the open end of the outwardly opening funnel portion of each of the side tubes is inclined with respect to the longitudinal axis of the associated tube to conform the open ends of the side tubes to the shape of the mouth of the individual.

8. Apparatus as recited in claim 5 and wherein the visual indicating means comprises a set of vertically mounted cylinders, each cylinder radially attached to the other end of one of the respective tubes and having a radial aperture providing air escape means for the tube to the associated cylinder, each said cylinder having an opening at the top so that air passing through the attached tube passes freely into the cylinder through the radial aperture therein, each cylinder containing means for visually indicating the relative quantity of air passing into the cylinder through the radial aperture.

9. Apparatus as recited in claim 7 and wherein the means for visually indicating the relative quantity of air passing into each respective cylinder comprises a flexible strip depending from the upper end of the cylinder to a position proximate the radial aperture so that air passing into the cylinder through the radial aperture deflects the flexible strip.

10. Apparatus as recited in claim 7 and additionally comprising a frame and wherein each of the cylinders mounted on the frame such that said cylinders are rotatable with respect to said frame about the longitudinal axes of said cylinders so that the tubes radially attached to the respective cylinders are pivotable to conform the open ends thereof to the mouth of the individual.

11. Apparatus as recited in claim 7 wherein the means for visually indicating the relative humidity of air passing into the center cylinder comprises a rotatable windmill disposed within said center cylinder adjacent the radial aperture therein so that air entering said center cylinder through said radial aperture causes said windmill to rotate.

12. Apparatus as recited in claim 7 wherein the length of said center tube is adjustable.

13. A method for indicating and teaching proper tongue formation for speaking, said method comprising the steps of: capturing the air expelled from the mouth of an individual while speaking; isolating the air expelled from different parts of the mouth; and indicating the magnitude of air expelled from each said different part of the mouth.

14. A method as recited in claim 13 wherein said indicating comprises the step of visually indicating the magnitude of air expelled from each said different part of the mouth.

15. A method as recited in claim 13 wherein said isolating comprises the step of isolating the air expelled from the center and the two sides of the mouth respectively.

16. Apparatus for indicating and teaching proper tongue and mouth formation for speaking, said apparatus comprising:

a planar member adapted to be maintained in a substantially horizontal configuration;

a set of three transparent cylinders axially mounted on the upper surface of the planar member, said cylinders being rotatable with respect to said planar member and having a radical aperture for flow of air into the cylinder and an axial aperture opposite the planar member for flow of air out of the cylinder;

a set of three tubes, each said tube having one end fixedly attached to one of the cylinders respectively at the radial aperture, the other ends of said tubes being open and adapted to be placed adjacent the mouth of an individual to capture and isolate air expelled from different parts of the mouth while speaking;

a set of three celluloid strips, each said strip disposed within one said respective cylinder and attached thereto adjacent the top of said cylinder, each said strip depending to a position proximate to the radial aperture in the associated cylinder and adapted to be flexed by air expelled from the mouth of the individual and captured by the associated tube as said air passes from the tube through the corresponding radial aperture to indicate the volume of air flowing through said aperture.

17. Apparatus as recited in claim 16 and additionally comprising a handle pivotably attached to the lower surface of the planar member.

* * * * *